US006456596B2

(12) United States Patent
Barker

(10) Patent No.: US 6,456,596 B2
(45) Date of Patent: *Sep. 24, 2002

(54) SYNCHRONOUS TRANSMISSION SYSTEMS

(75) Inventor: Andrew J Barker, Nottingham (GB)

(73) Assignee: Marconi Communications Limited, Coventry (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,138

(22) Filed: Mar. 29, 1999

Related U.S. Application Data

(63) Continuation of application No. 08/666,482, filed on Jul. 23, 1996, now Pat. No. 5,905,731.

(51) Int. Cl.[7] .............................. H04J 3/16; H04L 12/26
(52) U.S. Cl. ..................... 370/248; 370/351; 370/535
(58) Field of Search .................... 370/351, 352, 370/353, 357, 360, 384, 389, 392, 395, 396, 400, 401, 403, 409, 463, 465, 472, 476, 509, 522, 535, 225, 228, 244, 248, 249, 250; 340/825.01, 825.03, 826, 827

(56) References Cited

U.S. PATENT DOCUMENTS

| | | | |
|---|---|---|---|
| 4,999,829 A | 3/1991 | Fite, Jr. et al. ............. 370/218 |
| 5,251,213 A | * 10/1993 | Videlock et al. ............ 370/403 |
| 5,283,785 A | * 2/1994 | Ferguson ..................... 370/376 |
| 5,440,545 A | * 8/1995 | Buchholz et al. ............. 370/60 |
| 5,440,547 A | * 8/1995 | Easki et al. .................. 370/395 |
| 5,586,115 A | * 12/1996 | Nakano et al. ............. 370/376 |
| 5,896,378 A | * 4/1999 | Barker ........................ 370/384 |

FOREIGN PATENT DOCUMENTS

| | | |
|---|---|---|
| EP | 0206512 A2 | 12/1986 |
| EP | 0437197 A2 | 7/1991 |
| WO | WO90/0666 | 6/1990 |

OTHER PUBLICATIONS

Computer–Aided Network Planning For PDH And SDH Networks, Manfred Hammer, et al., PTO Philips Telecommunication Review, 51 (1993) Mar., No. 1, Hilversum, NL, pp. 43–50.

Performance and Fault Management Functions for the Maintenance of Sonet/SDH and ATM Transport Networks, John G. Gruber, et al., IEEE International Conference on Communications '83, May 23–26, 1993, Geneva, Switzerland, Technical Program, Confernece Record, vol. 3/3, pp. 1308–1314.

\* cited by examiner

*Primary Examiner*—Alpus H. Hsu
(74) *Attorney, Agent, or Firm*—Kirschstein, et al.

(57) ABSTRACT

In a digital telecommunications system having data packages carrying identification data, the identification data is characterized in that it is unique to the package within a station and does not depend on the identity of the originating station.

2 Claims, 1 Drawing Sheet

SYNCHRONOUS TRANSMISSION SYSTEMS

CROSS-REFERENCE TO RELATED APPLICATIONS

This application is a continuation of U.S. patent application Ser. No. 08/666,482, filed Jul. 23, 1996, now U.S. Pat. No. 5,905,731.

BACKGROUND OF THE INVENTION

The present invention relates to telecommunication systems and more particularly to digital hierarchy systems (SDH). In such systems data is switched within an individual station to the appropriate output port. Also alternate routes are provided between stations by which data can be transmitted from an originating stations port to a receiver stations port so that failure of one route, e.g. due to accidental damage, will not prevent the data from reaching the receiver stations port via the other route.

The data is sent in the form of two packages or so-called virtual containers which essentially are made up of two sections, one being the actual data which is transmitted, i.e. the so-called payload, and the other being data which is concerned with the integrity of the data, referred to hereinafter as overhead or ancillary data.

One of the requirements for a system of the kind outlined above is that there must be some means for checking whether the package is correctly switched (or routed) at each individual station along the overall path of the data. Essentially this is achieved by use of the ancillary or overhead data area at each station in order to include an identity, and other monitoring information, to ensure correct switching.

In our U.K. patent application no. 9301575, filed Jan. 27, 1993, entitled Switch Protection Arrangement, now abandoned, we disclose an arrangement where the package is identified in terms of the channel number of the data, and the receiving stations card number. However there is a potential problem with such an arrangement in situations where the package travels by the alternative route referred to earlier. In the event of failure of the first route the package will acquire a new channel and card number. This means that the destination port of the station will not recognize the package because it will be looking for a package which has an identification which is characteristic of the first route. This problem is a direct result of the use of the alternate route protection identified earlier.

SUMMARY OF THE INVENTION

The present invention is concerned with overcoming this problem.

According to the present invention in a digital telecommunications system of the kind referred to, data packages carry identification data which is unique to the package within a station, and does not depend on channel or card numbers.

In designing systems of the kind referred to there is always the conflicting requirement of on the one hand making maximum use of the transmission capacity to transmit payload data and on the other hand ensuring the correct transmission of that payload data. In other words in each data package a balance has to be struck between the ratio of payload capacity and overhead or ancillary capacity.

Further design constraints are the internationally agreed standards and protocols which are necessary to ensure that the various national telecommunications systems can communicate with one another, e.g. the so-called CCITT standards and protocols.

Included in the ITU (formally CCITT) standards concerning the above mentioned overhead or ancillary data is one which calls for data whose purpose is to provide monitoring of the actual data, referred to as the V4 byte. This is only valid between stations, allowing it separate use within a station. In addition some data packages (or payloads) do not have such an overhead that may be used, in which case a part of the Section Overhead of the traffic is used in its place. For clarity only the V4 byte is described below, but the same principle applies to the Section Overhead.

According to one aspect of the present invention overhead or ancillary data characteristic of the identification of a data package is substituted for the so-called V4 byte to ensure the correct routing of the data package whilst at the same time not creating an increase in the overhead or ancillary data contained in the data package. In other words the inclusion of such identification data does not result in a requirement for increased bandwidth.

More specifically where an add-drop multiplexer (ADMUX) is employed to switch data from a data transmission channel into a so-called tributary channel the package identification data is substituted for the V4 byte as the package enters the ADMUX and is re-substituted as the package leaves the ADMUX.

The package identification data may have the characteristics referred to in the above-identified U.K. patent application number 9301575 or the characteristics referred to above in connection with the present invention.

BRIEF DESCRIPTION OF THE DRAWINGS

How the invention may be carried out will now be described by way of example only and with reference to the accompanying drawings in which.

DETAILED DESCRIPTION OF THE PREFERRED EMBODIMENTS

Figure 1:
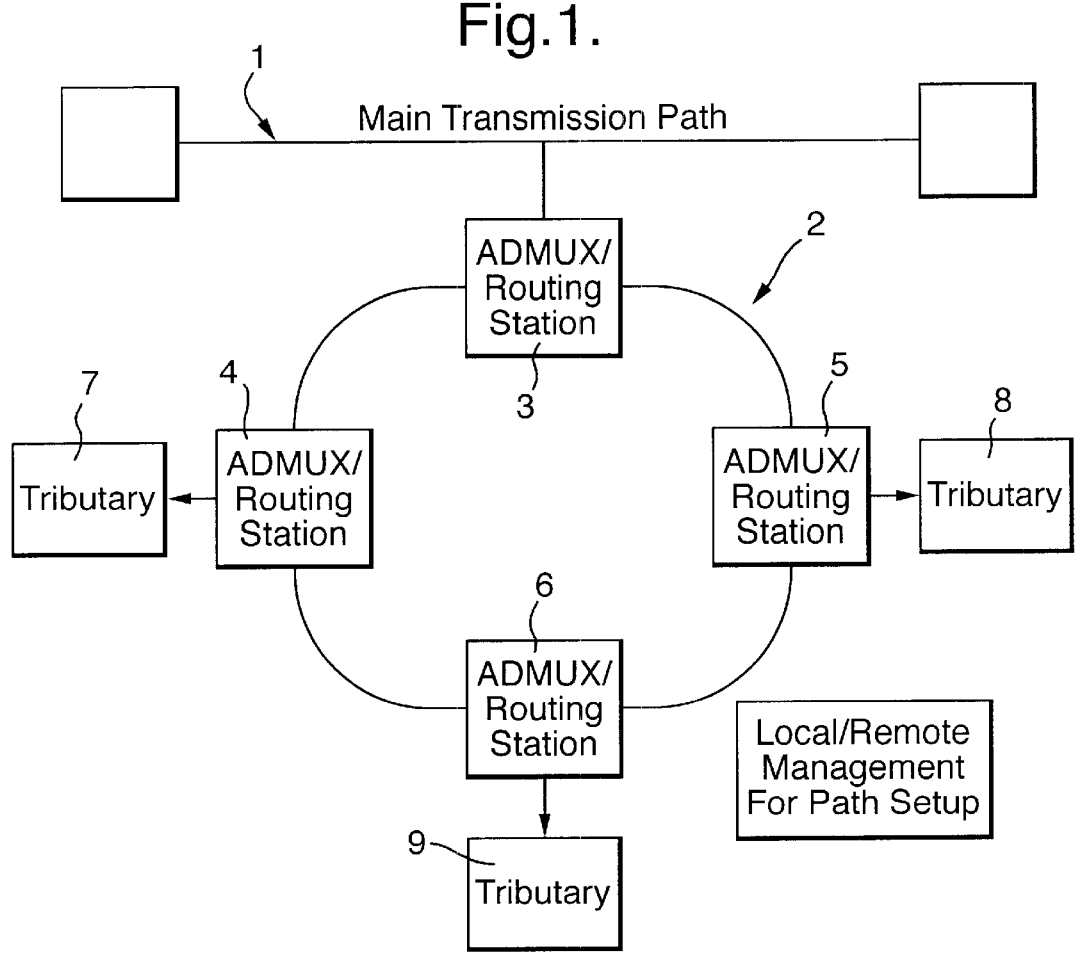
FIG. 1 is a diagrammatic representation of a typical transmission loop connected to a main transmission path.

A transmission loop 2 is connected to a main transmission path 1 through a switch in ADMUX 3. There is included in the transmission loop 2 ADMUX switches 4, 5 and 6 each of which serves tributaries 7, 8 and 9 respectively. Each ADMUX is known as a routing station.

Data destined for tributary 9 can reach the ADMUX 6 either through the path 3,4 or through the path 3,5. Data is sent on both paths, with the terminating ADMUX (ADMUX 6) selecting which to use. This provides protection against failure of either path. When the packet of data reaches its destination at 9, there must be means to check that the correct packet of data has been switched down to it by the switch in ADMUX 6. The present invention is concerned with ensuring that this is the case in arrangements where the so-called path protection is provided, i.e. the data can reach its destination by one of at least two routes.

Figure 2:
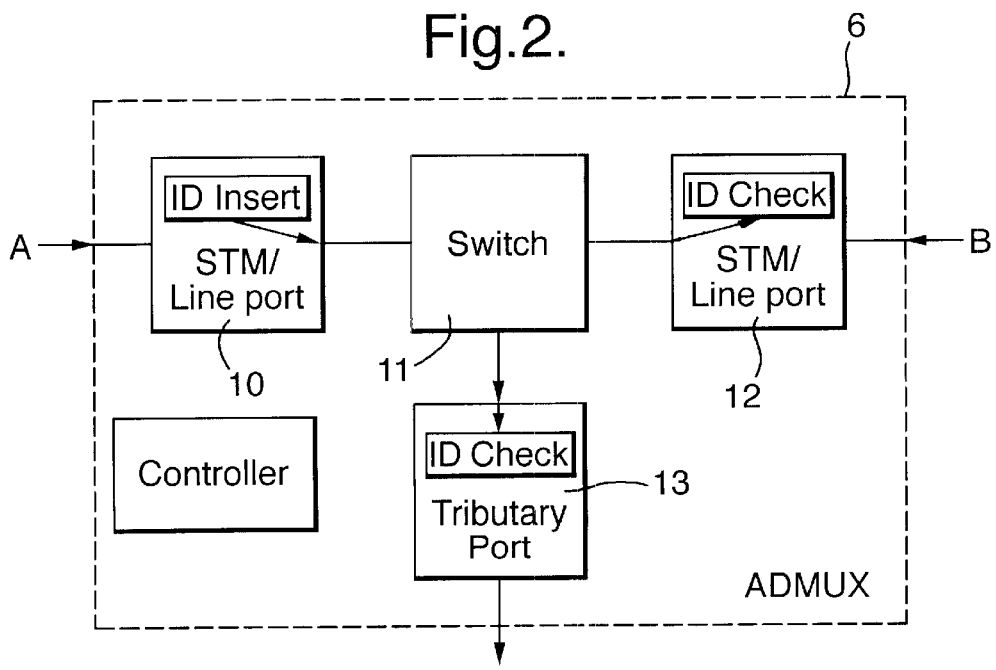
FIG. 2 shows diagrammatically and in more detail one of the ADMUX shown in FIG. 1.

Referring to FIG. 2, the ADMUX 6 (shown in dotted lines) consists essentially of four cards 10, 11, 12 and 13. Card 11 is the switch itself. Cards 10 and 12 are so-called synchronous transport modules (STM) or line ports which can be designed to multiplex at different levels e.g. 1, 4 or 16 which equate to bit rates of 155.52 Mbit/s, 622.08 Mbit/s and 2488.32 Mbit/s respectively would thus be designated STM1, STM4 or STM16 tributary card. Card 13 is a tributary port.

Data packages entering the ADMUX 6 at A and B will have inserted into the ancillary or overhead data in place of the V4 byte, data which uniquely identifies that data package within that ADMUX. This contrasts with the arrangement disclosed in the above-identified U.K. patent application no. 9301575 where the data package is identified in terms of its entry point into the ADMUX, for example by means of its channel number and card number. This would result in the packages at A and B having different identifications.

This identity is distinct from the other data which forms the overhead and which is designed to enable various checks to be made in order to monitor the integrity of the data being transmitted.

Having described the inventive concept illustrated in broad terms in relation to the accompanying drawings there will now be given a more detailed description of the embodiment of the present invention.

It is necessary to ensure that switch protection takes place automatically a failure condition at a destination port is detected or alternatively on demand from the ADMUX controller.

There are a number of conditions which can be used to initiate switching and these are:

mismatch on path identification number failure of parity checks failure of alignment loss-of system-clock transitions The first two-of the above involve the monitoring of diagnostic messages inserted by sender ports which are compared with data which is downloaded from a Mux Controller as a 'comparison message' or which is calculated internally (parity errors). For TU-1 and TU-2 SDH signals, where the diagnostic messages are contained in the V4 bytes and are completely updated only every 16 frames (4 V4 bytes), the comparison is carried out every four frames on a partial V4 message. For TU-3, AU-3 and AU4 signals, the diagnostic message is fully updated every frame.

According to the invention a path is first set up, and a controller is arranged to generate a 16 bit number which uniquely identifies that path, this number is inserted at each sender port into the diagnostic message for that channel, a separate number being used for each unidirectional path (i.e. a bi-directional path utilises 2 numbers). It will be appreciated that the 16 bit number generated, allows up to 65536 unique path numbers the ADMX4 being capable of having up to 1008 bi-directional or 2016 unidirectional cross connections.

At each destination port, the path identity number of each channel, inserted by the sender port, is arranged to be compared with the expected address (downloaded from the Mux Controller configuration-data).

The address check is arranged to be carried out on traffic from both Switch units simultaneously, to detect failures of either switch. This method of failure detection is preferably subject to a persistence check and protection switching is in accordance with established priorities.

In carrying the invention to effect parity checks are carried-out on the data of each channel. Parity bits are calculated at the sender port and inserted into the diagnostic messages such that even parity is maintained in each channel. At the destination port, the parity of each channel is again calculated and any parity errors generate an alarm signal. As with the source address checks, the parity checks are carried out on traffic from the working switch and the standby switch simultaneously. This method of failure detection is subject to a persistence check and protection switching is in accordance with the allocated priorities.

For TU-1 or TU-2 signals, V4 bytes occur every fourth frame (i.e. every multiframe) and a complete V4 diagnostic message requires four such bytes. Each parity bit for a channel is relevant to all bits from that channel within the previous multiframe (four frames), including the V4 byte. The four parity bits of the V4 message are therefore completely independent of each other and are related to the data of the previous four frames only.

For TU-3, AU-3 and AU-4 signals only eight parity bits are contained within the diagnostic message within the Signal path overhead (SOH). Since a complete diagnostic message is transmitted every frame, these are used to indicate the parity of the data within the previous frame.

Each peripheral card incorporates transition-loss detectors which the internal clock signals from each switch. A failure of the (38.88 MHz) clock shall be defined as a loss-of clock transitions for a period exceeding a nominal threshold of 125–500 nS. There need not be persistency check on clock failures.

A check is necessary to identify any alignment failure. If the alignment bits contained within the diagnostic messages are incorrect, the detecting destination port is arranged to generate a loss-of-frame alarm. This check is subject to a persistence check as described later.

A request to switch is arranged to be issued to all destination ports on receipt of a switch-failure indication by the Mux. controller. A manual request may also be issued when demanded by an operator via the NMI. These requests are treated as switch-failure conditions and acted upon in accordance with prescribed routines. No persistence check is carried out on such conditions.

In cases of diagnostic message failure, a persistence check is performed to prevent spurious switching during transient conditions (e.g. MSP switching). This check takes the form of a threshold on the number of permissible consecutive mismatches of the diagnostic messages, with the messages being partially updated and compared every multiframe. A hardware persistence check is therefore applied to the channel identification number and the parity check independently. This persistence is programmable from between 1 and 256 successive failures of the check.

The enabling and disabling of protection is carried out according to the following criteria:

a. Unconnected—no checks performed b. Connected—all checks performed c. Protected—all checks performed The V4-byte diagnostic message format is as shown in the following table.

| | | MSB | | | | | |
| --- | --- | --- | --- | --- | --- | --- | --- |
| | Parity bits | | Alignment bits. | | | LSB | |
| V4 byte 1 | P1 | 0 | A1 | 0 | D3 | D2 | D1 | D0 |
| V4 byte 2 | P2 | 0 | A2 | 0 | D7 | D6 | D5 | D4 |
| V4 byte 3 | P3 | 0 | A3 | 0 | D11 | D10 | D9 | D8 |
| V4 byte 4 | P4 | 0 | A4 | 0 | D15 | D14 | D13 | D12 |

These bits are defined as follows:

Data Parity

P1 P2 P3 P4

Alignment Bits

A1 A2 A3 A4

Path Identification Number

D0 to D15

The various Section Overhead diagnostic message configurations are treated as follows:

TU-3 and AU-3

The diagnostic message is contained in the first three columns of the first three rows of the SOH, as follows.

Section Overhead Bytes

| | Section Overhead Bytes | | |
|---|---|---|---|
| Row | | Column | |
| | 1 | 2 | 3 |
| 1 | AM1 | AM2 | AM3 |
| 2 | BM1 | BM2 | BM3 |
| 3 | CM1 | CM2 | CM3 |

Where the bytes shown have the format:

| | MSB | | | | | | | LSB |
|---|---|---|---|---|---|---|---|---|
| AMN = | P1 | P2 | P3 | P4 | P5 | P6 | P7 | P8 |
| BMN = | D7 | D6 | D5 | D4 | D3 | D2 | D1 | D0 |
| CMN = | D15 | D14 | D13 | D12 | D11 | D10 | D9 | D8 |

(where N = 1 to 3)

AU-4

The diagnostic message is contained in the first column of the first three rows of the SOH.

The three bytes 'A', 'B' and 'C' have the same format as bytes 'AMN', 'BMN' and 'CMN' for TU-3 and AU-3 signals.

Comparison messages sent from the mux. controller and stored in an ASIC at the destination ports have the following format:

| | MSB | | | | | | | LSB |
|---|---|---|---|---|---|---|---|---|
| Byte 1 = | D7 | D6 | D5 | D4 | D3 | D2 | D1 | D0 |
| Byte 2 = | D15 | D14 | D13 | D12 | D11 | D10 | D9 | D8 |

The system described above gives an effective protection arrangement for ADMX switch plane protection without any need for disabling a card when protection is applied to a traffic path.

I claim:

1. A digital telecommunications system arranged to route data packages including package identification data via alternative channels, the system comprising:

a) a plurality of routing stations each of the stations having a plurality of ports in which at least two of the plurality of ports in at least one of the stations are sender ports for sending the data packages through said at least one station, each of the ports comprising at least one card, the identification data being unique within said at least one station to a connection and being independent of identities of the channels or cards through which a data package is routed;

b) means for setting up a uni-directional route or path through said at least one station;

c) a controller for generating a unique identification number which uniquely identifies the connection;

d) means for inserting said identification number at each sender port into a diagnostic message for that channel; and e) means at each of a plurality of destination ports for comparing the identification number received with an expected identification number.

2. The digital telecommunication system as claimed in claim 1, in which the unique identification number is applied to the data package as the data package enters an add-drop multiplexer, in place of a V4-byte normally carried by the data package, and is replaced by the V4-byte as the data package leaves the add-drop multiplexer.

\* \* \* \* \*